US012712435B2

(12) United States Patent
Salian et al.

(10) Patent No.: US 12,712,435 B2
(45) Date of Patent: Aug. 18, 2026

(54) ADVANCED GATE DRIVER FOR IMPROVED EMI PERFORMANCE DURING MOSFET TURN-ON

(71) Applicant: Renesas Design (UK) Limited, Bourne End (GB)

(72) Inventors: Rakshitha Salian, San Jose, CA (US); Vijay Kanagala, Campbell, CA (US); Kai-wen Chin, Campbell, CA (US)

(73) Assignee: Renesas Design (UK) Limited, Bourne End (GB)

( * ) Notice: Subject to any disclaimer, the term of this patent is extended or adjusted under 35 U.S.C. 154(b) by 166 days.

(21) Appl. No.: 18/827,598

(22) Filed: Sep. 6, 2024

(65) Prior Publication Data

US 2026/0074607 A1 Mar. 12, 2026

(51) Int. Cl.

*H02M 1/08* (2006.01)
*H02M 1/00* (2006.01)
*H02M 1/44* (2007.01)
*H02M 3/335* (2006.01)

(52) U.S. Cl.

CPC ........... *H02M 1/08* (2013.01); *H02M 1/0012* (2021.05); *H02M 1/0029* (2021.05); *H02M 1/44* (2013.01); *H02M 3/33592* (2013.01)

(58) Field of Classification Search

CPC .. H02M 1/0012; H02M 1/44; H02M 3/33592; H02M 1/0029

See application file for complete search history.

(56) References Cited

U.S. PATENT DOCUMENTS 10,116,294 B1* 10/2018 Xu ........................ H03K 5/1536
2009/0268494 A1* 10/2009 Hu .......................... H02M 1/38 327/434
2018/0097447 A1* 4/2018 Lorio ................... H03K 17/163
2018/0351542 A1* 12/2018 Wang ................ H02M 3/33561
2019/0296730 A1* 9/2019 Ogura .................. H03K 17/163
2020/0024217 A1* 1/2020 Kammafoo ............... C07C 7/08
2020/0036293 A1* 1/2020 Kannan ............. H02M 3/33523
2021/0376712 A1* 12/2021 Chen ........................ H02M 1/08
2022/0224217 A1* 7/2022 Liu ..................... H02M 1/0029
2022/0416675 A1* 12/2022 Wei ......................... H02M 1/08
2023/0088396 A1* 3/2023 Ichikawa ........... G01R 31/2628 327/512

(Continued)

FOREIGN PATENT DOCUMENTS

EP 4322408 A1 2/2024

OTHER PUBLICATIONS

Office Action—Application No. 102024210315.2—Jul. 9, 2025.

*Primary Examiner* — Yusef A Ahmed

(74) *Attorney, Agent, or Firm* — Haynes and Boone, LLP

(57) ABSTRACT

A gate driver is provided for a switching power converter that charges a gate of the power switch transistor through a gate drive resistance that is varied through four portions of an on-time period for the power switch transistor. In a first portion and a second portion of the on-time period, the gate driver controls the gate drive resistance to be relatively low but then increases the gate driver resistance for a third portion of the on-time period. In a final fourth portion of the on-time period, the gate driver decreases the gate drive resistance. The fourth portion begins during a Miller plateau period for the gate voltage.

18 Claims, 3 Drawing Sheets

(56) References Cited

U.S. PATENT DOCUMENTS

| | | | | |
|---|---|---|---|---|
| 2023/0163759 | A1* | 5/2023 | Chen | H03K 17/165 |
| | | | | 327/109 |
| 2024/0106319 | A1* | 3/2024 | Zarabadi | B60L 15/007 |
| 2024/0154535 | A1* | 5/2024 | Ding | H02M 1/08 |
| 2024/0171083 | A1* | 5/2024 | Angkititrakul | H02M 1/36 |
| 2026/0074691 | A1* | 3/2026 | Salian | H03K 17/165 |

* cited by examiner

ADVANCED GATE DRIVER FOR IMPROVED EMI PERFORMANCE DURING MOSFET TURN-ON

TECHNICAL FIELD

This application relates to switching power converters, and more particularly to a to a gate driver for a MOSFET power switch transistor with EMI optimization during power switch turn-on.

BACKGROUND

During operation of a switching power converter, a controller controls the switching of a power switch metal-oxide-semiconductor field-effect transistor (MOSFET) connected to an inductor. For example, in a flyback converter the power switch transistor is typically an NMOS transistor having a drain connected to a primary winding of a transformer and a source coupled to ground. Prior to the power switch being switched on, the drain is charged to (or above) the input voltage to the primary winding. The input voltage is rectified from the AC mains and can thus be more than 100 V depending upon the AC mains cycling. With the power switch transistor being fully switched on, the drain is grounded. The drain of the power switch transistor is thus subjected to a relatively high rate of voltage change (dV/dt) during the power switch transistor turn on. This rapid change in the drain voltage of the power switch transistor may lead to an undesirable level of electromagnetic interference (EMI).

To reduce the EMI from the power switch cycling, it is conventional to drive the power switch transistor on through a relatively complicated drive circuit that includes external resistors, and a high-voltage Miller capacitor. The addition of these external components also make the turn-off very slow. Hence, the user would add a bipolar junction transistor or an antiparallel diode to improve the turn-off time. These drive circuit components increase cost and occupy circuit board space.

SUMMARY

In accordance with a first aspect of the disclosure, an adaptive gate driver for a power switch transistor in a switching power converter is provided that includes: a gate drive circuit configured to charge a gate voltage of the power switch transistor through a variable gate drive resistance; a first comparator configured to assert a first comparator output signal in response to a voltage of the gate voltage being greater than a first threshold voltage; a second comparator configured to assert a second comparator output signal in response to the voltage of the gate voltage being greater than a second threshold voltage that is greater than the first threshold voltage; and an adaptive drive control circuit configured to command the gate drive circuit to use a first gate drive resistance during a first portion of a power switch transistor on-time period while the first output comparator signal is not asserted and during a second portion of the on-time period following the assertion of the first output comparator signal and while the second comparator output signal is not asserted, and to use a second gate drive resistance during a third portion of the on-time period after the second comparator output signal is asserted and before a sampling period has expired, and to use a third gate drive resistance during a fourth portion of the on-time period after an expiration of the sampling period, wherein the adaptive drive control circuit is further configured to begin a timing of the sampling period in response to the assertion of the second comparator output signal, and wherein the adaptive drive control circuit is further configured to set the second gate drive resistance to be greater than the first gate drive resistance and to be greater than the third gate drive resistance in response to a detection that the switching power converter is in a discontinuous conduction mode of operation In accordance with a second aspect of the disclosure, a method of adapting a gate drive resistance for a power switch transistor in a switching power converter is provided that includes: charging a gate of the power switch transistor through a first gate drive resistance during a first portion of a power switch transistor on-time period while a gate voltage of the power switch transistor is less than a first threshold voltage and during a second portion of the on-time period while the gate voltage is less than a second threshold voltage that is greater than the first threshold voltage; initiating a timing of a sampling period responsive to the gate voltage being greater than the second threshold voltage; charging the gate through a second gate drive resistance during a third portion of the on-time period while the gate voltage is greater than the second threshold voltage and before an expiration of the sampling period, wherein the second gate drive resistance is greater than the first gate drive resistance; sampling the gate voltage at an expiration of the sampling period to provide a sampled gate voltage; charging the gate voltage through a third gate drive resistance during a fourth portion of the on-time period following the expiration of the sampling period; and adjusting the second threshold voltage to equal a fraction of the sampled gate voltage.

In accordance with a third aspect of the disclosure, a switching power converter, is provided that includes: an inductor; a power switch transistor connected to the inductor; and a gate drive control circuit configured to: charge a gate of the power switch transistor through a first gate drive resistance during a first portion of an on-time period for the power switch transistor and during a second portion of the on-time period; adapt the first gate drive resistance responsive to a duration of the first portion of the on-time period; charge the gate through a second gate drive resistance during a third portion of the on-time period, wherein the gate drive resistance is greater than the first gate drive resistance; and charge the gate through a third gate drive resistance during a fourth portion of the on-time period, wherein the second gate drive resistance is greater than the third gate drive resistance.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

To avoid the complications of using a Miller capacitor approach, adaptive gate drivers have been developed for driving the gate voltage of silicon-based switching power converters. In such adaptive gate drivers, the output impedance of the gate driver is modified depending upon the gate voltage to reduce the electromagnetic interference (EMI) noise during the turn-on times of the power switch transistors. As the gate voltage passes various threshold voltages, the output impedance is varied accordingly. Some or all of the threshold voltages may be based on the Miller plateau level of the gate voltage. As known in the MOSFET arts, a Miller plateau period occurs after the gate-to-source voltage for the power switch transistor has reached the transistor threshold voltage. The drain voltage then begins to fall due to the channel conduction, which tends to pull the gate voltage lower due to a gate-to-drain parasitic capacitance of the power switch transistor M1. The gate-to-drain parasitic capacitance is highly non-linear such that it is relatively small as the drain voltage begins to fall and increases in magnitude as the drain voltage approaches ground. The net result is that the gate voltage is relatively constant during the Miller plateau period, which ends once the gate-to-drain capacitance is discharged.

A comparator threshold voltage is adjusted based on the Miller plateau voltage. But this adjustment of the comparator threshold voltage could initially be set too high, leading to severe distortion with respect to an appropriate adjustment of the gate drive pull-up impedance. An improved gate driver is disclosed herein that addresses this issue. In addition, EMI noise is caused more by a rate of change in current as compared to the rate of voltage change during continuous conduction mode (CCM) operation. The improved gate driver disclosed herein adapts the pull-up impedance adjustment depending upon whether the switching power converter operates in CCM or in a discontinuous conduction mode (DCM).

Figure 1:
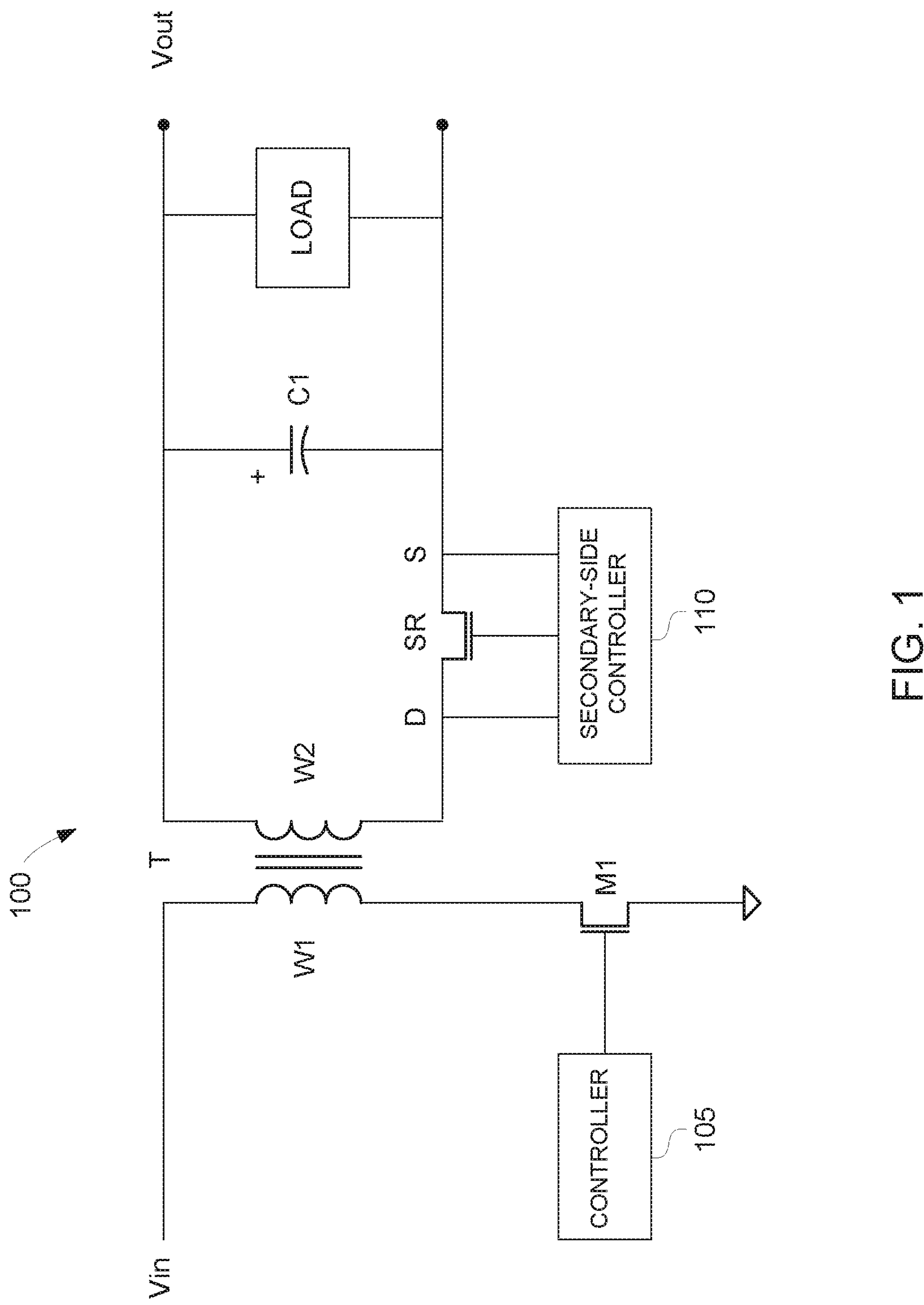
FIG. 1 illustrates a flyback converter including an adaptive gate driver in accordance with an aspect of the disclosure.

The following discussion will be directed to a gate driver for flyback converter implementations that use MOSFET power switch transistors, but it will be appreciated that the improved gate driver disclosed herein may be advantageously employed for the driving of any suitable MOSFET power switch transistor such as in a buck or a boost converter. An example flyback converter 100 is shown in FIG. 1 that includes an adaptive gate driver in a controller integrated circuit 105. Flyback converter 100 includes a transformer T having a primary winding W1 and a secondary winding W2. During operation, the adaptive gate driver charges the gate of an n-type MOSFET power switch transistor M1 connected to the primary winding W1 to switch on the power switch transistor M1 for an on-time period. The primary winding W1 also connects to an input voltage rail carrying a rectified input voltage (Vin). When the power switch transistor M1 is cycled on, a primary winding current begins to flow through the primary winding W1 and the power switch transistor M1 into ground. Once a desired peak winding current has been reached, the controller 105 may then control the adaptive gate driver to cycle off the power switch transistor M1. As used herein, "connected" refers to a direct electrical connection such as through a conducting lead whereas "coupled" refers to an electrical connection in which the connection may be through an intervening element such as a resistor or a diode.

A secondary-side controller U2 controls a synchronous rectifier (SR) switch transistor that couples between a return output terminal and the secondary winding W2. This SR control is in response to monitoring a drain (D) to source(S) voltage (VDS) across the SR switch transistor. Based upon the drain-to-source voltage VDS, the secondary-side controller 110 detects whether the power switch transistor M1 has cycled off so that the SR switch transistor may be switched on to allow the secondary winding current to flow and charge an output voltage Vout that is supported by an output capacitor C1. Alternatively, the secondary current may be rectified through an output diode in alternative implementations.

Figure 2:
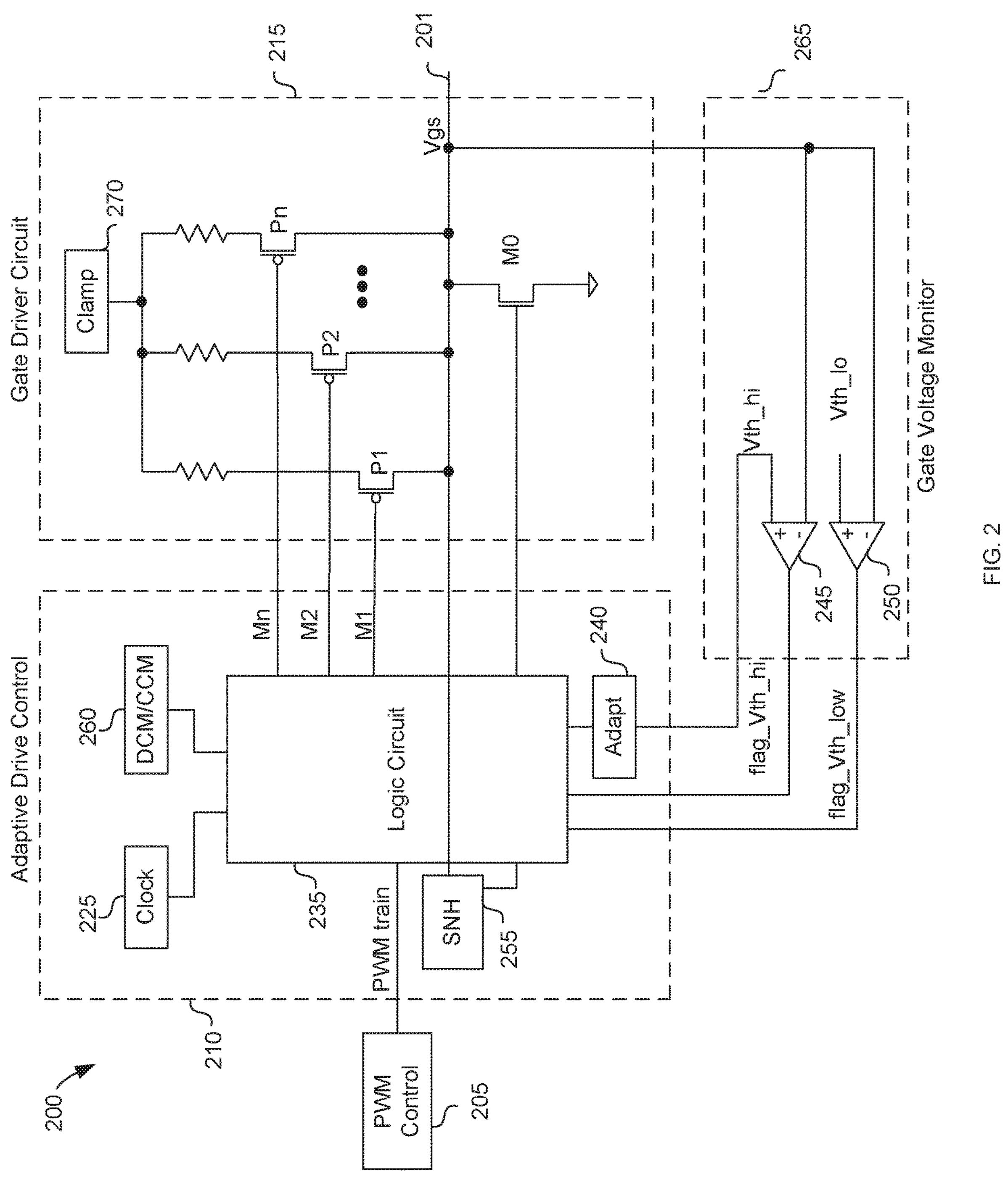
FIG. 2 is a circuit diagram of an adaptive gate driver in accordance with an aspect of the disclosure.

An example gate driver 200 is shown in more detail in FIG. 2. For illustration clarity and brevity, the corresponding flyback converter is represented by just a node 201 for the gate voltage Vgs. A modulation control circuit 205 provides a modulation control signal to an adaptive gate drive control circuit 210. For example, the modulation control circuit 205 may be a pulse-width modulation (PWM) control circuit that produces a train of PWM control signal pulses to control the desired on-time periods for the power switch transistor. The modulation control circuit 205 may be part of a primary-side controller or part of a secondary-side controller. If the modulation control circuit 205 is located on the secondary-side of the transformer, the PWM control signal would be transmitted across a ground-isolating channel such as an opto-isolator. Regardless of where the modulation control circuit 205 is located, it generates the PWM control signal responsive to feedback on the various operating signals such as the output voltage Vout or the input voltage Vin (FIG. 1).

The gate driver 200 includes a gate drive circuit 215 that implements a variable gate drive impedance and includes a gate voltage monitor or sensing circuit 265 that monitors the gate voltage (which is equivalent to the gate-to-source voltage Vgs of the power switch transistor since its source is grounded or effectively grounded). The gate voltage monitor 265 includes a high-threshold comparator 245 and a low-threshold comparator 250 for comparing the gate voltage of the power switch transistor to respective threshold voltages. In particular, the low-threshold comparator 250 compares a relatively low threshold voltage Vth_lo to the gate voltage to assert a comparator output signal flag_Vth_lo when the gate voltage has risen to equal Vth_lo. Similarly, the comparator 245 compares a relatively larger reference voltage Vth_hi to the gate volage to assert a comparator output signal flag_Vth_hi when the gate voltage has risen to equal Vth_hi during the switch turn on period. The low threshold voltage Vth_lo is fixed but the adaptive drive control circuit 210 adapts the high threshold voltage Vth_hi as will be further described herein.

The adaptive drive control circuit 210 includes a logic circuit 235 such as a microcontroller or microprocessor to control the drive impedance of the gate voltage for the power switch transistor. This control is exerted over four portions or divisions of the switch transistor turn-on period. A first portion T1 extends from the start of the turn-on period for the power switch transistor M1 (i.e., when the PWM control signal is asserted) until the gate voltage has risen to equal Vth_lo to cause low threshold voltage comparator 250 to assert a flag_Vth_lo output signal. During the first portion T1, the gate drive control circuit 210 controls the gate drive circuit 215 to charge the gate of the power switch transistor through a relatively low pull-up resistance (Rg1). A second portion T2 extends from the end of portion T1 until the gate voltage has risen to equal Vth_hi (Vth_hi being greater than Vth_lo) to cause the high voltage threshold comparator 245 to assert a flag_Vth_hi output signal. The pull-up resistance continues as Rg1 during the second portion T2.

A third portion T3 begins when the gate voltage has risen above the high threshold voltage Vth_hi. During the third portion T3, the gate drive control circuit 210 controls the gate drive circuit 215 to charge the gate through a relatively large pull-up resistance (Rg2) that is typically greater than Rg1. The Miller plateau period begins at some point during the third portion T3. Note that the drain-to-source voltage across the power switch transistor has most of its rapid decline during an initial portion of the Miller plateau period. It may thus cause excessive gate driver losses to maintain portion T3 (with its relatively large pull-up resistance Rg2) until the end of the turn-on period for the power switch transistor M1. To increase efficiency, the gate drive control circuit 210 thus begins timing a sampling period Ts (for example, 300 ns) at the beginning of the period T3. A sample-and-hold (SNH) circuit 255 is then triggered at the termination of the sampling period Ts to sample the gate voltage during the Miller plateau period. A fourth and final portion T4 of the on-time period begins at the termination of the sampling period. During the portion T4 of the on-time period, the logic circuit 235 controls the gate driver circuit 215 to drive the gate voltage through a relatively low drive resistance Rg3. In some implementations, Rg3 may be equal to Rg1.

The gate drive circuit 215 drives the gate voltage with a gate drive impedance during the switch turn-on period that varies depending upon which of the portions T1, T2, T3, and T4 is active. To implement the various gate drive resistances, the gate drive circuit 215 includes a plurality of n PMOS pull-up transistors ranging from a first PMOS pull-up transistor P1 to an nth PMOS pull-up transistor Pn, n being a positive plural integer. Each pull-up transistor has its source coupled through a corresponding resistor R to a power supply voltage rail such as supplied by a voltage clamp 270. For example, transistor P1 has its source coupled to the voltage clamp 270 through a resistor R and its drain connected to the gate of the power switch transistor M1, transistor P2 has its source coupled to the voltage clamp 270 through another resistor R and its drain connected to the gate of the power switch transistor M1, and so on such that the nth transistor Pn has its source coupled to the voltage clamp 270 through an nth resistor R and its drain connected to the gate of the power switch transistor M1. In some embodiments, the resistors may be conceptual in that they would be provided by the on-resistance of the respective transistor. Alternatively, the resistors may be external to the transistors. In addition, the resistors may instead couple between the corresponding transistor's drain and the gate of the power switch transistor M1 in alternative implementations.

To produce a low pull-up resistance such as the gate drive resistance Rg1 and Rg3, the drive control circuit 210 may switch on each (or most) of the pull-up transistors P1 through Pn. The gate drive pull-up resistance increases as fewer and fewer of the pull-up transistors P1 through Pn are switched on. The logic circuit b controls which of the pull-up transistors are switched on to implement the desired gate drive resistance. Logic circuit 235 may comprise a state machine, a microcontroller, or a microprocessor. During cycling of the power switch transistor M1, logic circuit 235 responds to the PWM control signal to then switch on the power switch transistor M1 for the desired on-time period by switching on the appropriate number of pull-up transistors. For a large pulse width, the on-time period is relatively long whereas it is shorter for smaller pulse widths. The beginning of the on-time period may be coordinated by a clock signal from a clock 225. Logic circuit 235 controls which of the pull-up transistors P1 through Pn is switched on through a corresponding gate drive signal. For example, the logic circuit 235 grounds a gate drive signal M1 to switch on the pull-up transistor P1, grounds a gate drive signal M2 to switch on the pull-up transistor P2, and so on such that the logic circuit 235 grounds a gate drive signal Mn to switch on the nth pull-up transistor Pn. Should one of the gate drive signals M1 through Mn be charged to a power supply voltage, the corresponding pull-up transistor is off. In alternative embodiments, current sources may be used to control the gate drive resistance level during the on-time period for the power switch transistor M1.

At the beginning of the power switch on-time period, the logic circuit 235 begins timing a startup period Ta that is ended when the logic circuit 235 detects that the low threshold voltage comparator 250 has asserted its output signal flag_Vth_low to indicate that the gate voltage has exceed the low threshold voltage Vth_lo. Should the logic circuit 235 detect that the startup period Ta is too short, the logic circuit 235 may increase the gate drive resistance Rg1. Conversely, if the logic circuit 235 detects that the startup period Ta is too long, the logic circuit 235 may decrease the gate drive resistance Rg1. An adaptation circuit 240 adapts the high threshold voltage Vth_hi to equal a fraction (e.g., 75%) of the sampled gate voltage taken by the sample-and-hold circuit 255. In this fashion, a smooth transition to the gate drive resistance Rg2 is ensured prior to the start of the Miller plateau period. In addition, the timing of the sampling period Ts from the start of the portion T3 ensures that the gate voltage will be sampled by the sample-and-hold circuit 255 during the Miller plateau period. However, during startup or other periods of instability, there is a possibility that the gate voltage could be sampled during the slope S3 of the gate voltage when the gate voltage rises past the Miller plateau period. The logic circuit 235 may thus time a maximum sampling period such as from the beginning of portion T1. Should the maximum sampling period expire, the logic circuit 235 forces a sampling of the gate voltage to avoid the slope S3.

Figure 3:
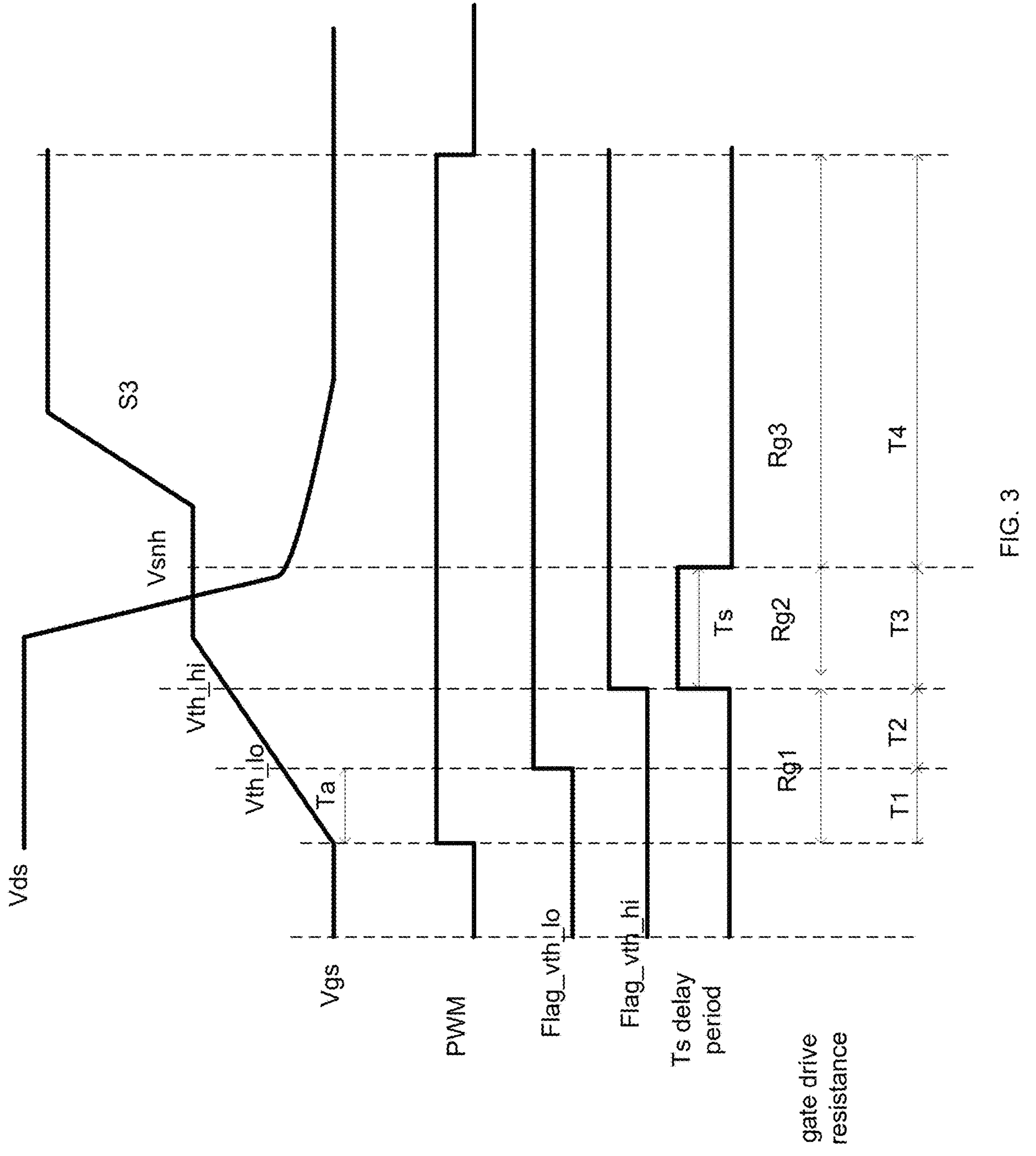
FIG. 3 illustrates some operating waveforms for the adaptive gate driver of FIG. 2.

The varying gate impedance during the turn-on and turn-off durations or periods may be better appreciated with reference to some example waveforms as shown in FIG. 3. Prior to the initial portion T1, the gate voltage Vgs is grounded with the power switch transistor being switched off. The drain-to-source voltage Vds across the power switch transistor is relatively high during this off time. At the start of portion T1, the gate drive circuit 215 then begins charging the gate voltage through the relatively low gate drive resistance Rg1 (as compared to Rg2) such that the gate voltage rapidly rises to the low threshold voltage Vth_lo.

Based upon the duration of the period Ta, the logic circuit 235 adapts the gate drive resistance Rg1 so that the turn-on period Ta is neither too long nor too short. If the turn-on period Ta is too long, the effective duty cycle suffers such that a power supply to a heavy load may be insufficient. Conversely, if the turn-on period Ta is too short, the low-threshold comparator 250 might be too slow to respond resulting in inaccurate assertion of flag_Vth_lo.

During the Miller plateau period, the drain-to-source voltage Vds drops quite rapidly. This rapid rate of decline then slows. The transition from the gate drive resistance Rg2 to Rg3 at the beginning of the portion T4 is thus quite advantageous in increasing efficiency as compared to maintaining the gate drive resistance Rg2 in both the portions T3 and T4.

The preceding gate drive control assumes that the switching power converter operates in a discontinuous conduction mode (DCM) of operation. The logic circuit 235 monitors (as shown conceptually by element 260) whether the DCM or a continuous conduction mode (CCM) of operation is active. At low AC line voltage, a switching power converter may enter the continuous conduction mode to reduce the core losses due to the higher peak inductor current. The Miller plateau region then shrinks from the lower drain-to-source voltage Vds. To sample the gate voltage during this reduced Miller plateau period, the sampling period Ts may be reduced such as from 300 ns to 150 ns. In addition, the electromagnetic interference (EMI) noise is reduced from the reduced rate of change of the drain-to-source voltage Vds during CCM operation. The logic circuit 235 may thus react to a transition to CCM operation by reducing the gate drive resistance Rg2 to be equal to or even less than the gate drive resistance Rg1. However, because the primary and secondary winding current in a flyback converter are not starting from zero during the continuous conduction mode of operation, the CCM operation results in increased noise from the increased rate of current change. Should there be excessive EMI from this increased rate of change for the current, the logic circuit 235 may increase the gate drive resistance Rg2 to be greater than the gate drive resistance Rg1 despite the CCM operation.

Those of some skill in this art will by now appreciate that many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. An adaptive gate driver for a power switch transistor in a switching power converter, comprising:

- a gate drive circuit configured to charge a gate voltage of the power switch transistor through a variable gate drive resistance;
- a first comparator configured to assert a first comparator output signal in response to the gate voltage being greater than a first threshold voltage;
- a second comparator configured to assert a second comparator output signal in response to the gate voltage being greater than a second threshold voltage that is greater than the first threshold voltage; and
- an adaptive drive control circuit configured to command the gate drive circuit to use a first gate drive resistance during a first portion of an on-time period for the power switch transistor while the first comparator output signal is not asserted and during a second portion of the on-time period for the power switch transistor following the assertion of the first comparator output signal and while the second comparator output signal is not asserted, and to use a second gate drive resistance during a third portion of the on-time period for the power switch transistor after the second comparator output signal is asserted and before a sampling period has expired, and to use a third gate drive resistance during a fourth portion of the on-time period for the power switch transistor after an expiration of the sampling period, wherein the adaptive drive control circuit is further configured to begin a timing of the sampling period in response to the assertion of the second comparator output signal, and wherein the adaptive drive control circuit is further configured to set the second gate drive resistance to be greater than the first gate drive resistance and to be greater than the third gate drive resistance in response to a detection that the switching power converter is in a discontinuous conduction mode of operation.

2. The adaptive gate driver of claim 1, wherein the adaptive drive control circuit is further configured to begin timing a startup delay at a beginning of the on-time period for the power switch transistor and to stop timing the startup delay in response to the assertion of the first comparator output signal.

3. The adaptive gate driver of claim 2, wherein the adaptive drive control circuit is further configured to compare a duration of the startup delay to a threshold delay and to increase the first gate drive resistance in response to the startup delay being less than the threshold delay.

4. The adaptive gate driver of claim 3, wherein the adaptive drive control circuit is further configured to decrease the first gate drive resistance in response to the startup delay being greater than the threshold delay.

5. The adaptive gate driver of claim 1, further comprising:

- a sample-and-hold circuit configured to sample the gate voltage at an expiration of the sampling period to provide a sampled gate voltage.

6. The adaptive gate driver of claim 5, wherein the adaptive drive control circuit is further configured to adapt the second threshold voltage to equal a fraction of the sampled gate voltage.

7. The adaptive gate driver of claim 6, wherein the fraction is approximately three-fourths.

8. The adaptive gate driver of claim 6, wherein the adaptive drive control circuit is further configured to reduce the sampling period in response to a detection that the switching power converter is in a continuous conduction mode of operation.

9. The adaptive gate driver of claim 1, wherein the gate drive circuit comprises a plurality of transistors coupled between a gate of the power switch transistor and a power supply node, and wherein the adaptive drive control circuit comprises a logic circuit configured to command a first number of transistors in the plurality of transistors to switch on during the first portion of the on-time period for the power switch transistor and during the second portion of the on-time period for the power switch transistor and to command a second number of transistors in the plurality of transistors to switch on during the third portion of the on-time period for the power switch transistor.

10. The adaptive gate driver of claim 9, wherein the first number is greater than the second number.

11. A method of adapting a gate drive resistance for a power switch transistor in a switching power converter, comprising:

- charging a gate of the power switch transistor through a first gate drive resistance during a first portion of an on-time period for the power switch transistor while a gate voltage of the power switch transistor is less than a first threshold voltage and during a second portion of the on-time period for the power switch transistor while the gate voltage is less than a second threshold voltage that is greater than the first threshold voltage;

initiating a timing of a sampling period responsive to the gate voltage being greater than the second threshold voltage;

charging the gate through a second gate drive resistance during a third portion of the on-time period for the power switch transistor while the gate voltage is greater than the second threshold voltage and before an expiration of the sampling period, wherein the second gate drive resistance is greater than the first gate drive resistance;

sampling the gate voltage at an expiration of the sampling period to provide a sampled gate voltage;

charging the gate through a third gate drive resistance during a fourth portion of the on-time period for the power switch transistor following the expiration of the sampling period; and adjusting the second threshold voltage to equal a fraction of the sampled gate voltage.

12. The method of claim 11, further comprising:

reducing the second gate drive resistance in response to a detection that the switching power converter is in a continuous conduction mode of operation.

13. The method of claim 11, further comprising:

increasing the first gate drive resistance in response to a duration of the first portion of the on-time period for the power switch transistor being less than a threshold delay; and decreasing the first gate drive resistance in response to the duration of the first portion of the on-time period for the power switch transistor being greater than the threshold delay.

14. The method of claim 11, further comprising:

timing a maximum delay that begins with a beginning of the on-time period for the power switch transistor; and transitioning from the third portion of the on-time period for the power switch transistor to the fourth portion of the on-time period for the power switch transistor in response to an expiration of the maximum delay.

15. The method of claim 11, wherein the third gate drive resistance is equal to the first gate drive resistance.

16. A switching power converter, comprising:

an inductor;

a power switch transistor connected to the inductor; and a gate drive control circuit configured to:

charge a gate of the power switch transistor through a first gate drive resistance during a first portion of an on-time period for the power switch transistor and during a second portion of the on-time period for the power switch transistor, wherein the first portion of the on-time period for the power switch transistor is terminated responsive to a gate voltage of the power switch transistor being greater than a first threshold voltage, and wherein the second portion of the on-time period for the power switch transistor is terminated responsive to the gate voltage of the power switch transistor being greater than a second threshold voltage that is greater than the first threshold voltage;

adapt the first gate drive resistance responsive to a duration of the first portion of the on-time period for the power switch transistor;

charge the gate through a second gate drive resistance during a third portion of the on-time period for the power switch transistor, wherein the second gate drive resistance is greater than the first gate drive resistance;

charge the gate through a third gate drive resistance during a fourth portion of the on-time period for the power switch transistor, wherein the second gate drive resistance is greater than the third gate drive resistance;

begin timing a sampling period in response to a beginning of the third portion of the on-time period for the power switch transistor;

transition from the third portion of the on-time period for the power switch transistor to the fourth portion of the on-time period for the power switch transistor in response to an expiration of the sampling period;

sample the gate voltage of the power switch transistor in response to the expiration of the sampling period to provide a sampled gate voltage; and adapt the second threshold voltage to equal a fraction of the sampled gate voltage.

17. The switching power converter of claim 16, wherein a duration of the sampling period is approximately 300 ns.

18. The switching power converter of claim 17, wherein the switching power converter comprises a flyback converter.

* * * * *